(12) United States Patent
Shi (10) Patent No.: US 10,270,785 B2
(45) Date of Patent: Apr. 23, 2019

(54) METHOD AND APPARATUS FOR IDENTIFYING MALICIOUS ACCOUNT

(71) Applicant: TENCENT TECHNOLOGY (SHENZHEN) COMPANY LIMITED, Shenzhen (CN)

(72) Inventor: Dan Shi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 108 days.

(21) Appl. No.: 15/310,076

(22) PCT Filed: May 8, 2015

(86) PCT No.: PCT/CN2015/078576
§ 371 (c)(1),
(2) Date: Nov. 9, 2016

(87) PCT Pub. No.: WO2015/172685
PCT Pub. Date: Nov. 19, 2015

(65) Prior Publication Data
US 2017/0155664 A1    Jun. 1, 2017

(30) Foreign Application Priority Data
May 12, 2014  (CN) .......................... 2014 1 0198151

(51) Int. Cl.
G06F 21/56   (2013.01)
H04L 29/06   (2006.01)
G06N 7/00    (2006.01)

(52) U.S. Cl.
CPC ............. *H04L 63/14* (2013.01); *G06N 7/005* (2013.01); *H04L 63/1416* (2013.01)

(58) Field of Classification Search
CPC ...................................................... G06F 21/56
See application file for complete search history.

(56) References Cited

U.S. PATENT DOCUMENTS

| | | |
|---|---|---|
| 8,271,865 B1 | 9/2012 | Bennett |
| 9,544,204 B1 * | 1/2017 | Madhivanan ........... H04L 67/22 |
| 2012/0131491 A1 | 5/2012 | Lee |

FOREIGN PATENT DOCUMENTS

| | | |
|---|---|---|
| CN | 101447101 A | 6/2009 |
| CN | 102163251 A | 8/2011 |

(Continued)

OTHER PUBLICATIONS

The World Intellectual Property Organization (WIPO) International Search Report for PCT/CN2015/078576 dated Jul. 29, 2015 pp. 1-3.

(Continued)

*Primary Examiner* — Josnel Jeudy
(74) *Attorney, Agent, or Firm* — Anova Law Group, PLLC (57) ABSTRACT

A method and an apparatus for identifying a malicious account are disclosed. Implementation of the method includes: using an effective reading speed of an account in a known normal account set as a training sample, and determining distribution data of the effective reading speed of the account in the normal account set; determining an upper reading speed threshold for the account in the normal account set according to the distribution data; acquiring a reading speed of a to-be-determined account; and determining, if the reading speed of the to-be-determined account exceeds the reading speed threshold, that the to-be-determined account is a malicious account. In the method, a fixed threshold set manually is no longer used, and a threshold is set on a statistics-based theoretical basis and is no longer randomly set manually; therefore, a malicious account for fake book viewing can be accurately identified.

15 Claims, 4 Drawing Sheets

(56) References Cited

FOREIGN PATENT DOCUMENTS

| | | |
|---|---|---|
| CN | 103077240 A | 5/2013 |
| CN | 103455532 A | 12/2013 |
| CN | 103678346 A | 3/2014 |
| EP | 2608002 A1 | 6/2013 |

OTHER PUBLICATIONS

The State Intellectual Property Office of the People's Republic of China (SIPO) Office Action 1 for 201410198151.2 dated Aug. 1, 2017 9 Pages (including translation).
Zhongmin Han et al., "Probabilistic Graphical Model for Identifying Water Army in Microblogging System", Journal of Computer Research and Development, Dec. 31, 2013. pp. 180-186.

* cited by examiner

METHOD AND APPARATUS FOR IDENTIFYING MALICIOUS ACCOUNT

CROSS-REFERENCES TO RELATED APPLICATIONS

This application claims priority of PCT Patent Application No. PCT/CN2015/078576, filed on May 8, 2015, which claims priority to Chinese Patent Application No. 2014101981512, entitled "METHOD AND APPARATUS FOR IDENTIFYING MALICIOUS ACCOUNT" filed on May 12, 2014, the entire contents of both of which are incorporated herein by reference.

FIELD OF THE TECHNOLOGY

The present disclosure relates to the field of communications technologies, and in particular, to a method and an apparatus for identifying a malicious account.

BACKGROUND OF THE DISCLOSURE

Net literature refers to recently generated literary works, texts similar to literature, and network artworks having some literary elements, which use the Internet as a publishing platform and a dissemination medium and are represented by means of hyperlinks, multimedia presentation, and the like. Online original works are dominated in net literature.

Net literature emerges with the popularization of the Internet. The Internet provides thousands of millions of netizens with a large amount of data and information of various types of literature, and meanwhile, net literature that is carried by and relies on this emerging media and uses this emerging media as a means, uses netizens as recipients, and has characteristics different from that of traditional literature quietly springs up.

Net literature and traditional literature are not opposite to each other, but are organic systems that permeate each other. A large amount of traditional literature becomes a part of net literature by means of electronization, and writers of net literature are also nurtured by traditional literature. In addition, net literature enters the field of traditional literature by means of publishing, and becomes an important constituent of popular culture by relying on the massive influence of networks, thereby affecting traditional literature.

In virtue of strong network media, net literature is characterized by diversification, interaction, and difficult intellectual property protection. Net literature may be in a form similar to that of traditional literature, and may also be in a form of non-traditional styles such as blogs, posts, and the like. Real-time replying, real-time commenting, and voting are important characteristics of net literature. Because net literature is disseminated conveniently, it is difficult to protect intellectual property.

To provide readers with popular electronic books of high quality and online reading of hottest online original novels, and provide internet friends in deep love of literature writing with a comprehensive original literature platform for online creation, online publicizing, and online sale, currently, a large number of net literature platforms already appear.

An original writer or a content provider (CP) publishes a work of the writer or the CP on a net literature platform, and in return, the net literature platform determines, according to data such as the number of effective reading users, the number of read words, collection and subscription data of the literature work, to pay to the party publishing the literature work, so that an intellectual property owner can obtain a corresponding reward, thereby forming a virtuous creation environment, and promoting literature development.

However, a party publishing a literature work "views records of a book". Fake book viewing refers to a behavior performed by a writer or a CP to read a book of the writer or the CP by improper means to increase data such as the number of effective reading users, the number of read words, and collection and subscription data of the book abnormally, thereby ensuring that the book can obtain more earnings, be ranked in a better position in a ranking list, and have a better promotion position. Therefore, the behavior of fake book viewing not only disturbs a normal operation order of a net literature platform, but also greatly damages interests of a writer or a CP who do not cheat, so that they cannot acquire a deserved reward. Therefore, how to identify malicious accounts for fake book viewing becomes a necessary technical requirement.

Currently, a malicious account may be identified in the following manner. A threshold of the maximum number of words is manually set; and if the number of read words of an account exceeds the threshold, it is determined that the account is a malicious account. Generally, the threshold of the maximum number of words is a fixed value determined according to experience, and is usually a large value to reduce incorrect determining.

In the foregoing solution, the threshold of the maximum number of read words is set manually, which has no theoretical basis. In addition, it is extremely easy for a CP or a writer to find a rule thereof, thereby adjusting a fake book viewing strategy, and limiting the number of words for fake book viewing per day to be less than a threshold. Therefore, manually setting the number of read words to distinguish a fake book viewing user has no obvious effect and has a low distinguishing degree. As a result, in the foregoing solution, a malicious account cannot be accurately identified.

SUMMARY

Embodiments of the present invention provide a method and an apparatus for identifying a malicious account, which are used to accurately identify a malicious account for fake book viewing.

A method for identifying a malicious account runs on a server, the server including a memory, one or more processors, and a program instruction stored in the memory and executed by the one or more processors, and the method includes: using an effective reading speed of an account in a known account set as a training sample, and determining distribution data of the effective reading speed of the account in the account set, the account set including no malicious account; determining an upper reading speed threshold for the account in the account set according to the distribution data; acquiring a reading speed of a to-be-determined account in a reading platform; and determining, if the reading speed of the to-be-determined account exceeds the reading speed threshold, that the to-be-determined account is a malicious account.

An apparatus for identifying a malicious account includes a memory, one or more processors, and one or more program modules stored in the memory and executed by the one or more processors, the one or more program modules including: a training unit, configured to use an effective reading speed of an account in a known account set as a training sample, and determine distribution data of the effective reading speed of the account in the account set, the account set including no malicious account; a threshold determining unit, configured to determine an upper reading speed threshold for the account in the account set according to the distribution data; and a determining unit, configured to acquire a reading speed of a to-be-determined account in a reading platform; and determine, if the reading speed of the to-be-determined account exceeds the reading speed threshold, that the to-be-determined account is a malicious account.

A non-transitory computer readable storage medium stores computer executable instructions, when the executable instructions run in a computer, the following steps being performed: using an effective reading speed of an account in a known account set as a training sample, and determining distribution data of the effective reading speed of the account in the account set, the account set including no malicious account; determining an upper reading speed threshold for the account in the account set according to the distribution data; acquiring a reading speed of a to-be-determined account in a reading platform; and determining, if the reading speed of the to-be-determined account exceeds the reading speed threshold, that the to-be-determined account is a malicious account.

It can be seen from the foregoing technical solutions that the embodiments of the present invention have the following advantages: an effective reading speed of an account in a known normal account set is used as a training sample, and distribution data of the effective reading speed of the account in the normal account set is determined; and an upper reading speed threshold for the account in the normal account set is determined according to the distribution data. A fixed threshold set manually is no longer used, and a threshold is set on a statistics-based theoretical basis and is no longer randomly set manually; therefore, a malicious account for fake book viewing can be accurately identified.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the present disclosure in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

Figure 1:
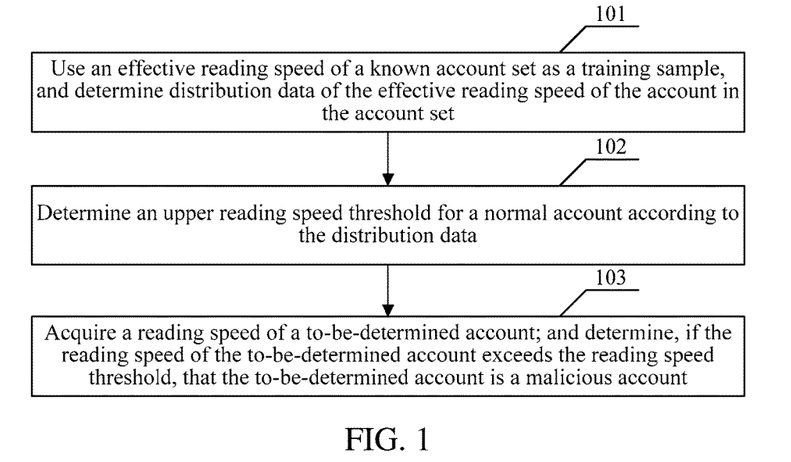
FIG. 1 is a schematic flowchart of a method according to an embodiment of the present invention.

An embodiment of the present invention provides a method for identifying a malicious account. As shown in FIG. 1, the method includes the following steps.

101: Use an effective reading speed of an account in a known account set as a training sample, and determine distribution data of the effective reading speed of the account in the account set.

In this embodiment of the present invention, the account set is a set including a normal account, and the number of samples in the set may be randomly set, and generally, may be set to be large to improve data accuracy. For the purpose of being different from a malicious account below, the account set is collectively referred to as a normal account set in the following description, accounts in the normal account set are collectively referred to as normal accounts, and the normal account set includes no malicious account. Each account includes a normal account and a malicious account, and may correspond to one user.

The effective reading speed may be a ratio of the number of words to time, and may be represented by a calculated value, and may also be the number of words of effective reading that is acquired according to a time segment. For example, the number of words of effective reading for one day. In this embodiment of the present invention, "effective" is relative to "ineffective". For example, the number of words should be counted only once when an account repeatedly clicks a same passage, and the first click is effective and a repeated click except the first click is ineffective. In this way, an actual reading quantity can be counted more accurately.

102: Determine an upper reading speed threshold for the account in the normal account set according to the distribution data.

According to actual statistics, a normal reading speed of a user has a characteristic of Gaussian distribution, that is, reading speeds concentrate in a middle area; there are few people whose reading speeds are much faster than the reading speed range of the area, and there are also few people whose reading speeds are much slower than the reading speed range of the area. Therefore, a threshold may be set according to data of the distribution characteristic. For example, it may be regarded that an account whose reading speed exceeds the threshold has a higher possibility of being a malicious account.

103: Acquire a reading speed of a to-be-determined account; and determine, if the reading speed of the to-be-determined account exceeds the reading speed threshold, that the to-be-determined account is a malicious account.

In this embodiment of the present invention, an effective reading speed of an account in a known normal account set is used as a training sample, and distribution data of the effective reading speed of the account in the normal account set is determined. An upper reading speed threshold for the account in the normal account set is determined according to the distribution data. A fixed threshold set manually is no longer used, and a threshold is set on a statistics-based theoretical basis and is no longer randomly set manually. Therefore, a malicious account for fake book viewing can be accurately identified.

An embodiment of the present invention further provides a specific implementation solution about how to specifically determine the distribution data and how to determine the reading speed threshold according to the distribution data, which is specifically as follows. The determining distribution data of the effective reading speed of the normal account in the normal account set includes determining a distribution model, of the effective reading speed of the account in the normal account set, which conforms to Gaussian distribution. The determining an upper reading speed threshold for the account in the normal account set according to the distribution data includes: determining the upper reading speed threshold, for the account in the normal account set, in the distribution model by using a cumulative distribution function of Gaussian distribution.

The effective reading speed is the number of words of effectively read per day, and the reading speed threshold is a threshold of the number of read words per day; and the threshold of the number of read words is generated periodically each day.

The upper reading speed threshold for the account in the normal account set may be acquired, for example, in the following manner: counting a reading speed threshold per day of each normal account, comparing the reading speed thresholds per day of the normal accounts in the normal account set, and using the maximum reading speed threshold per day as an upper reading speed threshold for the normal accounts.

In this embodiment of the present invention, the threshold of the number of read words is generated periodically every day; in this way, a threshold may dynamically change by generating the threshold every day, which self-adapts to an increase or a decrease of a threshold during holiday or at the end of a month, thereby identifying a malicious account for fake book viewing more accurately.

In the foregoing embodiment, a malicious account is identified based on a net literature platform. In addition, an embodiment of the present invention further provides a solution of using data outside a reading platform for further assistance to improve identification accuracy, which is specifically as follows: before the determining that the to-be-determined account is a malicious account, the method further includes acquiring malicious characteristic information, of a known malicious account, outside the reading platform, and determining a maliciousness probability of the to-be-determined account according to the malicious characteristic information; and determining, if the maliciousness probability is greater than a preset threshold and the reading speed of the to-be-determined account exceeds the reading speed threshold, that the to-be-determined account is a malicious account.

In this embodiment, the to-be-determined account is further determined by using the malicious characteristic information outside the reading platform, so as to decrease a possibility that a normal account with a high reading speed is incorrectly determined, thereby further improving accuracy of identifying a malicious account.

In the foregoing embodiment, if a malicious account is determined only by using the reading speed threshold, to reduce incorrect determining on a normal account with a high reading speed, the reading speed threshold is usually set to be large; therefore, there is a risk of missed identification of malicious account. Based on the solution of using data outside the reading platform for further assistance in this embodiment of the present invention, in this embodiment of the present invention, the reading speed threshold may be decreased to reduce the risk of missed malicious accounts.

A specific implementation solution is as follows: the determining an upper reading speed threshold for the account in the normal account set according to the distribution data includes: determining an upper reading speed threshold per time for the normal account according to the distribution data, where the reading speed threshold per time is less than the reading speed threshold; and the reading speed of the to-be-determined account exceeding the reading speed threshold includes: the reading speed of the to-be-determined account exceeding the reading speed threshold per time.

An embodiment of the present invention further provides an optional specific value of the malicious characteristic information as follows: the malicious characteristic information includes: characteristic information of at least one of a friend network, interest distribution, and a degree of activeness.

An embodiment of the present invention further provides a solution of acquiring the maliciousness probability, which is specifically as follows: the acquiring malicious characteristic information, of a known malicious account, outside the reading platform, and determining a maliciousness probability of the to-be-determined account according to the malicious characteristic information includes: training sample data to obtain a prior probability according to a Bayesian classification algorithm and the malicious characteristic information; and acquiring characteristic information of the to-be-determined account, and determining a maliciousness probability of the characteristic information of the to-be-determined account according to the prior probability.

In the foregoing embodiment, a friend network, interest distribution, and a degree of activeness, of a malicious account, outside the reading platform are used as training samples, the malicious samples are trained according to the Bayesian classification algorithm to obtain a prior probability, and the to-be-determined account is evaluated according to the prior probability to obtain the maliciousness probability of the characteristic information of the to-be-determined account. The solution of combining external data and internal data of the reading platform can reduce the number of missed malicious accounts while avoiding incorrectly identifying malicious accounts, thereby improving accuracy of identifying a malicious account.

In the following embodiment, a reading platform, such as Tencent Literature, is used as an application scenario to further describe the embodiments of the present invention in detail by using examples.

Figure 2:
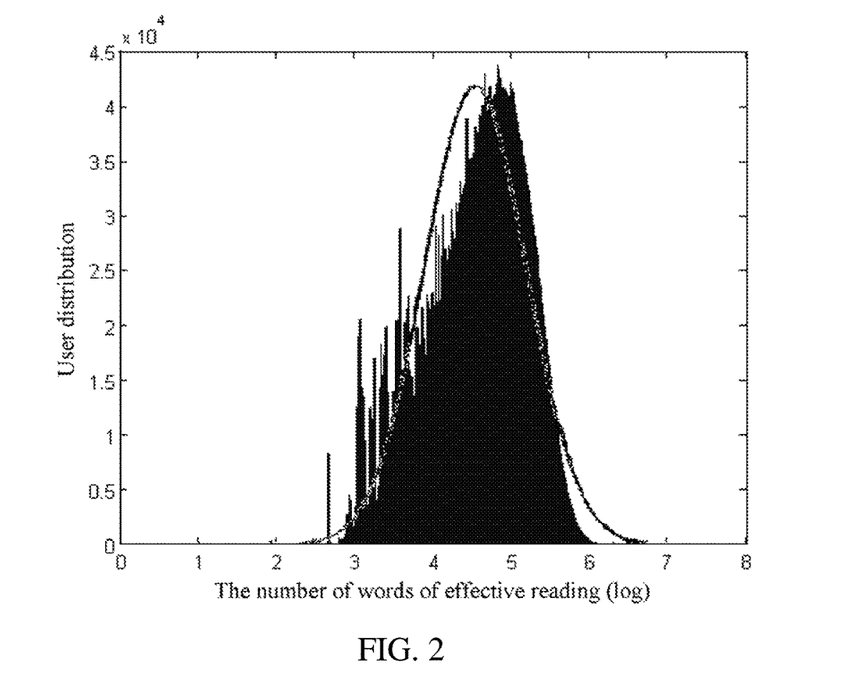
FIG. 2 is a schematic diagram of theoretical and actual user distribution for the number of words of effective reading according to an embodiment of the present invention.

In this embodiment of the present invention, fake book viewing users are cracked down on mainly in two aspects, namely, inside a service and outside the service. Inside the service, a reading behavior model of a user of Tencent Literature is built, and a fake book viewing user is found according to a probability theory. Outside the service, a prior probability of a fake book viewing user is obtained according to sample data of the fake book viewing user by using a Bayesian classification method, a probability that the user fake views a book is then obtained according to the prior probability and a user attribute, and a union set of fake book viewing users inside the service and outside the service is finally acquired and placed in a blacklist of the reading platform. A specific solution is as follows:

1. Fake Traffic Prevention Inside the Service—Gaussian Distribution Model:

A user reading behavior model is built. In a diagram of theoretical and actual user distribution for the number of words of effective reading shown in FIG. 2, the horizontal axis shows the number of words of effective reading (log), and the vertical axis shows user distribution. In FIG. 2, a curve is a theoretical distribution curve, and a pattern formed by black vertical lines shows actual distribution of the number of words of effective reading of users. It can be known by checking by using a normplot function (a probability paper check function) in matlab (a type of mathematical software, and a high-level technical computing language and interactive environment for algorithm development, data visualization, data analysis, and numerical computation) that the numbers of words of effective reading of users in Tencent Literature conform to a Gaussian distribution model, and a range of normal users can be determined by using a cumulative distribution function of Gaussian distribution. For example, 95% of users may be theoretically used as normal users to calculate a threshold of the number of read words. For the model, a threshold is generated each day according to user reading behaviors of last week and changes dynamically, which self-adapts to an increase or a decrease of a threshold during holiday or at the end of a month.

In this embodiment of the present invention, the foregoing 95% may be set; and this ratio may be increased to reduce incorrect determining, and the ratio may be decreased to reduce the number of missed malicious accounts. In combination with fake traffic prevention outside the service in the following embodiment, the ratio may be set to be low to reduce the number of missed maliciouse accounts.

2. Fake Traffic Prevention Outside the Service—Bayesian Classification:

In a normal case, a normal user is not only a user of the reading platform, but also is active in another application to some extent.

Figure 3:
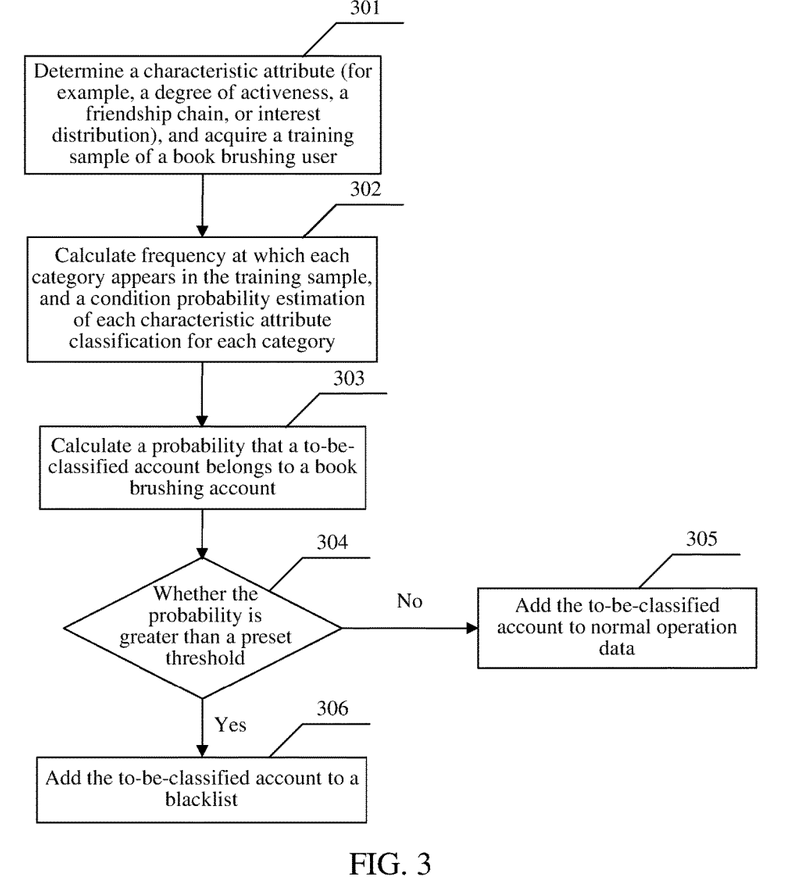
FIG. 3 is a schematic flowchart of a method according to an embodiment of the present invention.

An existing fake book viewing user account is analyzed, and a user characteristic is analyzed from aspects such as a degree of activeness, a friend network, and interest distribution; sample data is trained according to a Bayesian classification algorithm; and a posterior probability that a new user is a fake book viewing user is acquired according to a prior probability. In this way, a fake book viewing user is found, and fake book viewing by a CP or a writer with a subsidiary account is effectively cracked down on. A process is shown in FIG. 3.

301: Determine a characteristic attribute (for example, a degree of activeness, a friend network, or interest distribution), and acquire a training sample of a fake book viewing user.

302: Calculate frequency at which each category appears in the training sample, and a condition probability estimation of each characteristic attribute classification for each category (a full probability formula).

303: Calculate, according to a definition of a joint probability, a probability that a to-be-classified account belongs to a fake book viewing account.

304: Determine whether the probability that the to-be-classified account belongs to a fake book viewing account is greater than a preset threshold; and if yes, perform 306; otherwise, perform 305.

305: Add the to-be-classified account to normal operation data.

306: Add the to-be-classified account to a blacklist.

In this embodiment of the present invention, a fake book viewing user is cracked down on in two aspects, namely, inside a service and outside the service. Inside the service, a reading threshold changes dynamically each day according to Gaussian distribution, thereby effectively avoiding a leakage problem of a fixed threshold. Outside the service, new users are automatically classified according to characteristic attributes of existing fake book viewing samples by using a Bayesian classification algorithm, thereby effectively cracking down on a fake book viewing subsidiary account. By using the foregoing solution, an impact of fake book viewing users in Tencent Literature on operation data and earnings can be reduced, a normal operation order of a reading platform can be ensured, and overall quality and reputation of a net literature operation platform can be improved.

Figure 4:
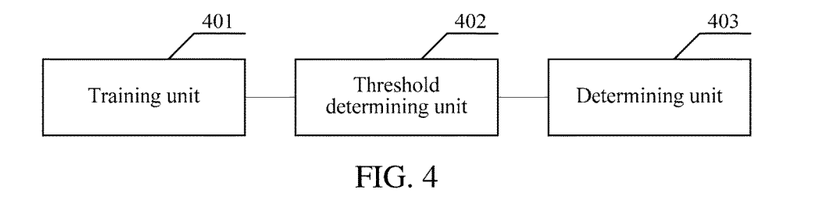
FIG. 4 is a schematic structural diagram of an apparatus according to an embodiment of the present invention.

An embodiment of the present invention provides an apparatus for identifying a malicious account. As shown in FIG. 4, the apparatus includes: a training unit 401, configured to use an effective reading speed of an account in a known normal account set as a training sample, and determine distribution data of the effective reading speed of the account in the normal account set; a threshold determining unit 402, configured to determine an upper reading speed threshold for the account in the normal account set according to the distribution data determined by the training unit 401; and a determining unit 403, configured to acquire a reading speed of a to-be-determined account; and determine, if the reading speed of the to-be-determined account exceeds the reading speed threshold, that the to-be-determined account is a malicious account.

In this embodiment of the present invention, the normal account set is a set including a normal account, and the number of samples in the set may be randomly set, and generally, may be set to be large to improve data accuracy. The effective reading speed may be a ratio of the number of words to a time, and may be represented by a calculated value, and may also be the number of words of effective reading that is acquired according to a time segment, for example, the number of words of effective reading for one day. In this embodiment of the present invention, "effective" is relative to "ineffective". For example, the number of words should be counted only once when an account repeatedly clicks a same passage, and the first click is effective and a repeated click except the first click is ineffective. In this way, an actual reading quantity can be counted more accurately.

According to actual statistics, a normal reading speed of a user has a characteristic of Gaussian distribution, that is, reading speeds concentrate in a middle area; there are few people whose reading speeds are much faster than the area, and there are also few people whose reading speeds are much slower than the area. Therefore, a threshold may be set according to data of the distribution characteristic, and it may be regarded that an account whose reading speed exceeds the threshold has a higher possibility of being a malicious account.

In this embodiment of the present invention, an effective reading speed of an account in a known normal account set is used as a training sample, and distribution data of the effective reading speed of the account in the normal account set is determined; and an upper reading speed threshold for the account in the normal account set is determined according to the distribution data. A fixed threshold set manually is no longer used, and a threshold is set on a statistics-based theoretical basis and is no longer randomly set manually; therefore, a malicious account for fake book viewing can be accurately identified.

An embodiment of the present invention further provides a specific implementation solution about how to specifically determine the distribution data and how to determine the reading speed threshold according to the distribution data, which is specifically as follows: the training unit 401 is configured to determine that the effective reading speed of the account in the normal account set conforms to a distribution model of Gaussian distribution; and the threshold determining unit 402 is configured to determine the upper reading speed threshold, for the account in the normal account set, in the distribution model by using a cumulative distribution function of Gaussian distribution.

The effective reading speed is the number of words effectively read per day, and the reading speed threshold is a threshold of the number of read words per day; and the threshold determining unit 402 is configured to generate the threshold of the number of read words periodically each day.

In this embodiment of the present invention, the threshold of the number of read words is generated periodically each day; in this way, a threshold may dynamically change by generating the threshold each day, which self-adapts to an increase or a decrease of a threshold during holiday or at the end of a month, thereby identifying a malicious account for fake book viewing more accurately.

Figure 5:
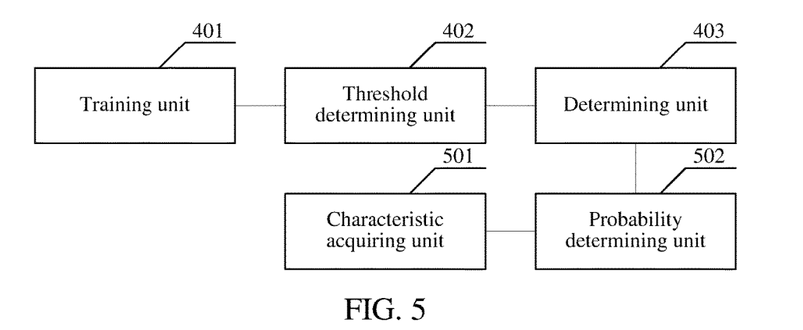
FIG. 5 is a schematic structural diagram of an apparatus according to an embodiment of the present invention.

In the foregoing embodiment, a malicious account is identified based on a net literature platform. In addition, an embodiment of the present invention further provides a solution of using data outside a reading platform for further assistance to improve identification accuracy, which is specifically as follows: As shown in FIG. 5, the apparatus further includes: a characteristic acquiring unit 501, configured to acquire malicious characteristic information, of a known malicious account, outside the reading platform before the determining unit 403 determines that the to-be-determined account is a malicious account; and a probability determining unit 502, configured to determine a maliciousness probability of the to-be-determined account according to the malicious characteristic information, where the determining unit 403 is further configured to determine, if the maliciousness probability determined by the probability determining unit 502 is greater than a preset threshold, that the to-be-determined account is a malicious account.

In this embodiment, the to-be-determined account is further determined by using the malicious characteristic information outside the reading platform, so as to avoid a possibility that a normal account with a high reading speed is incorrectly determined, thereby further improving accuracy of identifying a malicious account.

In the foregoing embodiment, if a malicious account is determined only by using the reading speed threshold, to reduce incorrect determining on a normal account with a high reading speed, the reading speed threshold is usually set to be large; therefore, there is a risk of missed identification of malicious accounts. Based on the solution of using data outside the reading platform for further assistance in this embodiment of the present invention, in this embodiment of the present invention, the reading speed threshold may be decreased to reduce the risk of missed identification of malicious accounts. A specific implementation solution is as follows: the threshold determining unit 402 is configured to determine an upper reading speed threshold per time for the normal account according to the distribution data, where the reading speed threshold per time is less than the reading speed threshold; and the determining unit 403 being configured to determine that the reading speed of the to-be-determined account exceeds the reading speed threshold includes: determining that the reading speed of the to-be-determined account exceeds the reading speed threshold per time.

An embodiment of the present invention further provides an optional specific value of the malicious characteristic information as follows. The malicious characteristic information includes: characteristic information of at least one of a friend network, interest distribution, and a degree of activeness.

An embodiment of the present invention further provides a solution of acquiring the maliciousness probability, which is specifically as follows: the characteristic acquiring unit 501 is configured to train sample data to obtain a prior probability according to a Bayesian classification algorithm and the malicious characteristic information; and the probability determining unit 502 is configured to acquire characteristic information of the to-be-determined account, and determine a maliciousness probability of the characteristic information of the to-be-determined account according to the prior probability calculated by the characteristic acquiring unit 501.

In the foregoing embodiment, a friend network, interest distribution, and a degree of activeness, of a malicious account, outside the reading platform are used as training samples, the malicious samples are trained according to the Bayesian classification algorithm to obtain a prior probability, and the to-be-determined account is evaluated according to the prior probability to obtain the maliciousness probability of the characteristic information of the to-be-determined account. The solution of combining external data and internal data of the reading platform can reduce the number of missed malicious accounts while avoiding incorrectly identifying malicious accounts, thereby improving accuracy of identifying a malicious account.

Figure 6:
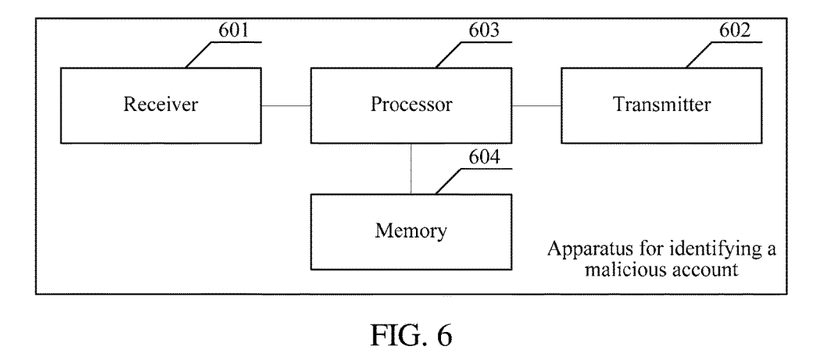
FIG. 6 is a schematic structural diagram of an apparatus for identifying a malicious account according to an embodiment of the present invention.

An embodiment of the present invention provides another apparatus for identifying a malicious account. As shown in FIG. 6, the apparatus includes: a receiver 601, a transmitter 602, a processor 603, and a memory 604.

The processor 603 is configured to use an effective reading speed of an account in a known normal account set as a training sample, and determine distribution data of the effective reading speed of the account in the normal account set; determine an upper reading speed threshold for the account in the normal account set according to the distribution data; acquire a reading speed of a to-be-determined account; and determine, if the reading speed of the to-be-determined account exceeds the reading speed threshold, that the to-be-determined account is a malicious account.

In this embodiment of the present invention, the normal account set is a set including a normal account, and the number of samples in the set may be randomly set, and generally, may be set to be large to improve data accuracy. The effective reading speed may be a ratio of the number of words to a time, and may be represented by a calculated value, and may also be the number of words of effective reading that is acquired according to a time segment, for example, the number of words of effective reading for one day. In this embodiment of the present invention, "effective" is relative to "ineffective". For example, the number of words should be counted only once when an account repeatedly clicks a same passage, and the first click is effective and a repeated click except the first click is ineffective. In this way, an actual reading quantity can be counted more accurately.

According to actual statistics, a normal reading speed of a user has a characteristic of Gaussian distribution, that is, reading speeds concentrate in a middle area; there are few people whose reading speeds are much faster than the area, and there are also few people whose reading speeds are much slower than the area. Therefore, a threshold may be set according to data of the distribution characteristic, and it may be regarded that an account whose reading speed exceeds the threshold has a higher possibility of being a malicious account.

In this embodiment of the present invention, an effective reading speed of an account in a known normal account set is used as a training sample, and distribution data of the effective reading speed of the account in the normal account set is determined; and an upper reading speed threshold for the account in the normal account set is determined according to the distribution data. A fixed threshold set manually is no longer used, and a threshold is set on a statistics-based theoretical basis and is no longer randomly set manually; therefore, a malicious account for fake book viewing can be accurately identified.

An embodiment of the present invention further provides a specific implementation solution about how to specifically determine the distribution data and how to determine the reading speed threshold according to the distribution data, which is specifically as follows: the processor 603 being configured to determine distribution data of the effective reading speed of the account in the normal account set includes: determining that the effective reading speed of the account in the normal account set conforms to a distribution model of Gaussian distribution; and the processor 603 being configured to determine an upper reading speed threshold for the account in the normal account set according to the distribution data includes: determining the upper reading speed threshold, for the account in the normal account set, in the distribution model by using a cumulative distribution function of Gaussian distribution.

The effective reading speed is the number of words effectively read per day, and the reading speed threshold is a threshold of the number of read words per day; and the threshold of the number of read words is generated periodically each day.

In this embodiment of the present invention, the threshold of the number of read words is generated periodically each day; in this way, a threshold may dynamically change by generating the threshold each day, which self-adapts to an increase or a decrease of a threshold during holiday or at the end of a month, thereby identifying a malicious account for fake book viewing more accurately.

In the foregoing embodiment, a malicious account is identified based on a net literature platform. In addition, an embodiment of the present invention further provides a solution of using data outside a reading platform for further assistance to improve identification accuracy, which is specifically as follows: Before determining that the to-be-determined account is a malicious account, the processor 603 is further configured to acquire malicious characteristic information, of a known malicious account, outside the reading platform, and determine a maliciousness probability of the to-be-determined account according to the malicious characteristic information; and determine, if the maliciousness probability is greater than a preset threshold and the reading speed of the to-be-determined account exceeds the reading speed threshold, that the to-be-determined account is a malicious account.

In this embodiment, the to-be-determined account is further determined by using the malicious characteristic information outside the reading platform, so as to avoid a possibility that a normal account with a high reading speed is incorrectly determined, thereby further improving accuracy of identifying a malicious account.

In the foregoing embodiment, if a malicious account is determined only by using the reading speed threshold, to reduce incorrect determining on a normal account with a high reading speed, the reading speed threshold is usually set to be large; therefore, there is a risk of missed identification of malicious accounts. Based on the solution of using data outside the reading platform for further assistance in this embodiment of the present invention, in this embodiment of the present invention, the reading speed threshold may be decreased to reduce the risk of missed identification of malicious accounts. A specific implementation solution is as follows: the processor 603 being configured to determine an upper reading speed threshold for the account in the normal account set according to the distribution data includes: determining an upper reading speed threshold per time for the normal account according to the distribution data, where the reading speed threshold per time is less than the reading speed threshold; and the processor 603 being configured to make the reading speed of the to-be-determined account exceed the reading speed threshold includes: the reading speed of the to-be-determined account exceeding the reading speed threshold per time.

An embodiment of the present invention further provides an optional specific value of the malicious characteristic information. The malicious characteristic information includes: characteristic information of at least one of a friend network, interest distribution, and a degree of activeness.

An embodiment of the present invention further provides a solution of acquiring the maliciousness probability, which is specifically as follows: the processor 603 being configured to acquire malicious characteristic information, of a known malicious account, outside the reading platform, and determine a maliciousness probability of the to-be-determined account according to the malicious characteristic information includes: training sample data to obtain a prior probability according to a Bayesian classification algorithm and the malicious characteristic information; and acquiring characteristic information of the to-be-determined account, and determining a maliciousness probability of the characteristic information of the to-be-determined account according to the prior probability.

In the foregoing embodiment, a friend network, interest distribution, and a degree of activeness of a malicious account, outside the reading platform are used as training samples. The malicious samples are trained according to the Bayesian classification algorithm to obtain a prior probability, and the to-be-determined account is evaluated according to the prior probability to obtain the maliciousness probability of the characteristic information of the to-be-determined account. The solution of combining external data and internal data of the reading platform can reduce the number of missed malicious accounts while avoiding incorrectly identifying malicious accounts, thereby improving accuracy of identifying a malicious account.

Figure 7:
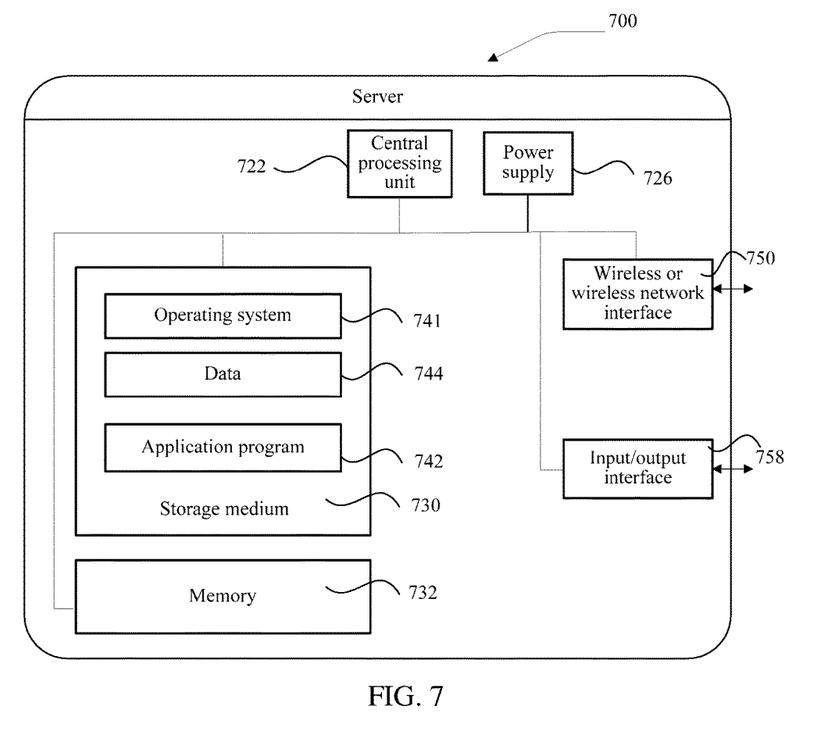
FIG. 7 is a schematic structural diagram of a server according to an embodiment of the present invention.

FIG. 7 is a schematic structural diagram of a server according to an embodiment of the present invention. The server 700 may vary greatly due to different configurations or performance, and may include one or more central processing units (CPUs) 722 (for example, one or more processors), a memory 732, one or more storage media 730 (for example, one or more mass storage devices) for storing an application program 742 or data 744. The memory 732 and the storage medium 730 may perform transient storage or persistent storage. The program stored in the storage medium 730 may include one or more modules (not shown in the figure), and each module may include a series of program instructions and operations for the server. Further, the CPU 722 may be set to communicate with the storage medium 730, and execute, on the server 700, a series of instructions and operations in the storage medium 730.

The server 700 may further include one or more power supplies 726, one or more wired or wireless network interfaces 750, one or more input/output interfaces 758, and/or one or more operating systems 741 such as Windows Server™, Mac OS X™, Unix™, Linux™, and FreeBSD™.

The steps performed by the apparatus for identifying a malicious account in the foregoing embodiments may be based on the structure of the server shown in FIG. 7.

For example, an apparatus for identifying a malicious account may include CPUs 722 (for example, one or more processors), a memory 732, one or more storage media 730 (for example, one or more mass storage devices) for storing an application program 742 or data 744. The apparatus may store data related to effective reading speeds and account data (744) in the storage media 730. The apparatus may perform various functions related to identifying malicious account through computer programs (742) stored in storage medial 730. Users may interact with the apparatus through one or more wired or wireless network interfaces 750, one or more input/output interfaces 758.

It should be noted that in the foregoing apparatus and server embodiments, the unit division is merely logical function division, but the present disclosure is not limited to the foregoing division, as long as corresponding functions can be implemented. In addition, specific names of the functional units are merely provided for the purpose of distinguishing the units from one another, but are not intended to limit the protection scope of the present disclosure.

In addition, a person of ordinary skill in the art may understand that all or some of the steps in the foregoing method embodiments may be implemented by a program instructing relevant hardware. A corresponding program may be stored in a computer readable storage medium. The storage medium may be a read-only memory, a magnetic disk, an optical disc, or the like.

The foregoing descriptions are merely preferred specific embodiments of the present invention, but are not intended to limit the protection scope of the present disclosure. Any variation or replacement readily figured out by a person skilled in the art within the technical scope disclosed in the embodiments of the present invention shall fall within the protection scope of the present disclosure. Therefore, the protection scope of the present disclosure shall be subject to the protection scope of the claims.

What is claimed is:

1. A method for identifying a malicious account, running on a server, the server comprising a memory, one or more processors, and a program instruction stored in the memory and executed by the one or more processors, and the method comprising:

using a first reading speed of an account in a known account set as a training sample, and determining distribution data of the first reading speed of the account in the account set, the account set comprising no malicious account;

determining a reading speed threshold for the account in the account set according to the distribution data;

acquiring a second reading speed of a to-be-determined account in a reading platform; and determining, that the to-be-determined account is a malicious account if the second reading speed of the to-be-determined account exceeds the reading speed threshold, and determining that the to-be-determined account is not a malicious account if the second reading speed of the to-be-determined account does not exceed the reading speed threshold;

wherein, the reading speed threshold is automatically determined by using the training sample of the account set, so that the malicious account is automatically identified by the reading speed threshold.

2. The method according to claim 1, wherein the determining distribution data of the first reading speed of the account in the account set comprises:

determining a distribution model, of the first reading speed of the account in the account set, which conforms to Gaussian distribution; and the determining the reading speed threshold for the account in the account set according to the distribution data comprises:

determining the reading speed threshold, for the account in the account set, in the distribution model of Gaussian distribution by using a cumulative distribution function of Gaussian distribution.

3. The method according to claim 1, wherein the first reading speed is the number of words read per day, and the reading speed threshold is a threshold of the number of read words per day; and the threshold of the number of read words is generated periodically every day.

4. The method according to claim 1, wherein the determining that the to-be-determined account is a malicious account comprises:

acquiring malicious characteristic information of a known malicious account, outside the reading platform, and determining a maliciousness probability of the to-be-determined account according to the malicious characteristic information; and determining, if the maliciousness probability is greater than a preset threshold and the second reading speed of the to-be-determined account exceeds the reading speed threshold, that the to-be-determined account is a malicious account.

5. The method according to claim 4, wherein the determining the reading speed threshold for the account in the account set according to the distribution data comprises:

determining the reading speed threshold per time of the account in the account set according to the distribution data, wherein the reading speed threshold per time is less than the reading speed threshold; and the second reading speed of the to-be-determined account exceeding the reading speed threshold comprises: the second reading speed of the to-be-determined account exceeding the reading speed threshold per time.

6. The method according to claim 4, wherein the malicious characteristic information comprises: at least one of a friend network, interest distribution, and a degree of activeness.

7. The method according to claim 6, wherein the acquiring malicious characteristic information, of a known malicious account, outside the reading platform, and determining a maliciousness probability of the to-be-determined account according to the malicious characteristic information comprises:

training sample data to obtain a prior probability according to a Bayesian classification algorithm and the malicious characteristic information; and acquiring characteristic information of the to-be-determined account, and determining a maliciousness probability of the characteristic information of the to-be-determined account according to the prior probability.

8. An apparatus for identifying a malicious account, comprising:
a memory; and
one or more processors,
wherein the one or more processors are configured to:
use a first reading speed of an account in a known account set as a training sample, and determine distribution data of the first reading speed of the account in the account set, the account set comprising no malicious account;
determine a reading speed threshold for the account in the account set according to the distribution data;
acquire a second reading speed of a to-be-determined account in a reading platform; and
determine, if the second reading speed of the to-be-determined account exceeds the reading speed threshold, that the to-be-determined account is a malicious account, and determine, if the second reading speed of the to-be-determined account does not exceed the reading speed threshold, that the to-be-determined account is not a malicious account;
wherein, the reading speed threshold is automatically determined by using the training sample of the account set, so that the malicious account is automatically identified by the reading speed threshold.

9. The apparatus according to claim 8, wherein the processor is further configured to:
determine a distribution model, of the first reading speed of the account in the account set, which conforms to Gaussian distribution; and
determine the reading speed threshold, for the account in the account set, in the distribution model of Gaussian distribution by using a cumulative distribution function of Gaussian distribution.

10. The apparatus according to claim 8, wherein the first reading speed is the number of words of reading per day, and the reading speed threshold is a threshold of the number of read words per day; and
the processor is configured to generate the threshold of the number of read words periodically each day.

11. The apparatus according to claim 8, wherein the processor is further configured to:
acquire malicious characteristic information, of a known malicious account, outside the reading platform before the determining unit determines that the to-be-determined account is a malicious account; and
determine a maliciousness probability of the to-be-determined account according to the malicious characteristic information, wherein
the processor is further configured to determine, if the maliciousness probability determined by the probability determining unit is greater than a preset threshold, that the to-be-determined account is a malicious account.

12. The apparatus according to claim 11, wherein the processor is further configured to:
determine the reading speed threshold per time of the account in the account set according to the distribution data, wherein the reading speed threshold per time is less than the reading speed threshold; and
determine that the second reading speed of the to-be-determined account exceeds the reading speed threshold per time.

13. The apparatus according to claim 11, wherein the malicious characteristic information comprises: at least one of a friend network, interest distribution, and a degree of activeness.

14. The apparatus according to claim 13, wherein the processor is further configured to:
train sample data to obtain a prior probability according to a Bayesian classification algorithm and the malicious characteristic information; and
acquire characteristic information of the to-be-determined account, and determine a maliciousness probability of the characteristic information of the to-be-determined account according to the prior probability calculated by the characteristic acquiring unit.

15. A non-transitory computer readable storage medium, storing computer executable instructions, when the executable instructions are executed by a computer to perform the following steps:
using a first reading speed of an account in a known account set as a training sample, and determining distribution data of the first reading speed of the account in the account set, the account set comprising no malicious account;
determining a reading speed threshold for the account in the account set according to the distribution data;
acquiring a second reading speed of a to-be-determined account in a reading platform; and
determining, if the second reading speed of the to-be-determined account exceeds the reading speed threshold, that the to-be-determined account is a malicious account, and determining, if the second reading speed of the to-be-determined account does not exceed the reading speed threshold, that the to-be-determined account is not a malicious account;
wherein, the reading speed threshold is automatically determined by using the training sample of the account set, so that the malicious account is automatically identified by the reading speed threshold.

* * * * *